Feb. 19, 1952
S. E. RICHESON ET AL
2,586,715
PRESSURE COOKING DEVICE
Filed March 15, 1947
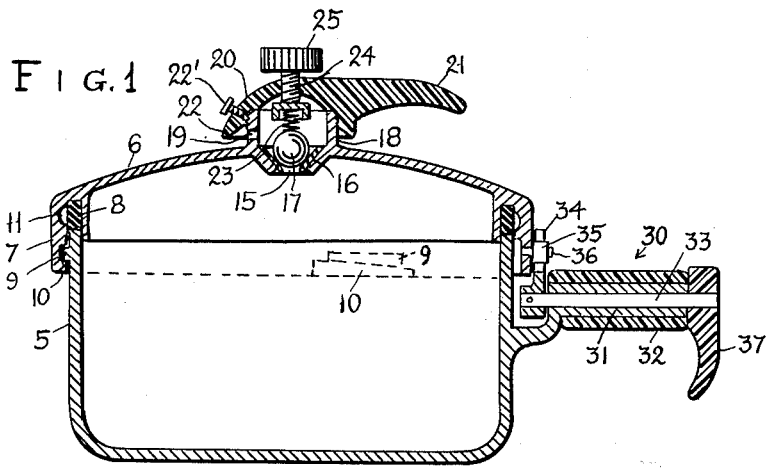
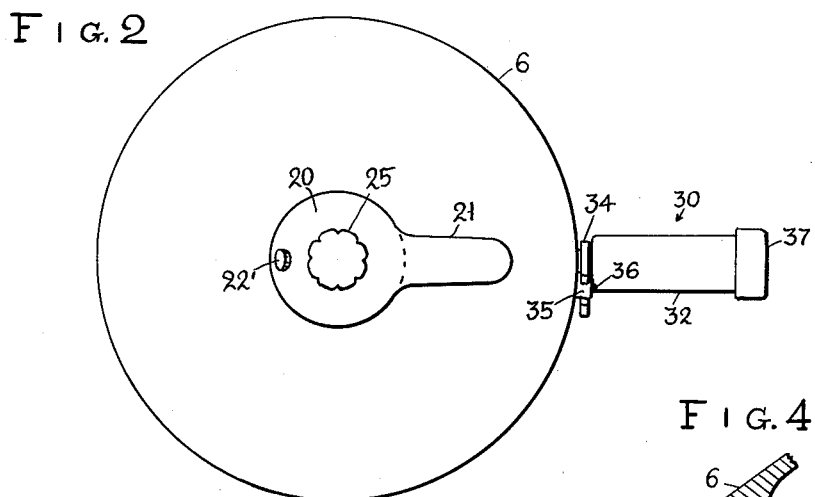
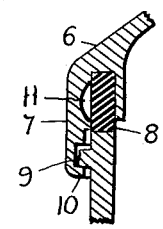
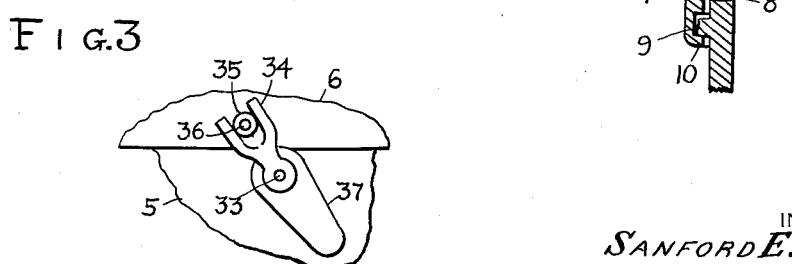
INVENTORS
SANFORD E. RICHESON
JOSEPH A. ALLEGRO
BY Frederick E. Hair
ATTORNEY Patented Feb. 19, 1952

2,586,715

UNITED STATES PATENT OFFICE 2,586,715

PRESSURE COOKING DEVICE

Sanford E. Richeson and Joseph A. Allegro, New York, N. Y., assignors of one-third to Louis C. Huber, Ridgewood, N. J.

Application March 15, 1947, Serial No. 734,977

4 Claims. (Cl. 220—40)

Our invention relates to pressure cooking devices and has particular reference to cooking devices or cookers for cooking food articles under pressure.

Our invention has further reference to pressure cookers comprising cooking pots with covers, the pots and the covers having cooperating interlocking lugs or projections for locking and tightening the covers on the pots by rotating the covers thereon, thereby sealing the pots and making it possible to raise the vapor or steam pressure in the pots to a desired value.

In conventional cookers the pot and the cover have independent handles for producing relative rotation therebetween for locking or unlocking the cover on the pot. Such an arrangement has a disadvantage in that the operator must use both hands for this purpose.

One of the objects of our invention is to provide means whereby the cover can be rotated on the pot by one hand, leaving the other hand free. We also provide an improved mechanism for this purpose whereby a rolling friction is introduced between the relatively moving parts of the operating parts, thereby materially reducing the force required for tightening and releasing the cover and also the wear of the parts.

Another object of our invention is to provide an improved safety valve employing a ball and an elastic seat therefor, the valve being associated with a handle conveniently located on top of the cover.

Still another object of our invention is to provide an improved sealing means between the pot and the cover which will effectively seal the pot independently of the vapor pressure therein.

The foregoing and other objects and features of our invention are more fully described in the accompanying specification and drawing in which:

Fig. 1 is a sectional elevational view of our pressure cooking device showing the cover in a closed or operative position;

Fig. 2 is a top plan view of the same partly in section;

Fig. 3 is a fractional detail view of the locking mechanism; and

Fig. 4 is a detail sectional view on an enlarged scale of the sealing ring between the pot and the cover.

The pressure cooking device according to the drawings comprises an open vessel or pot 5 of generally cylindrical shape and provided with a cover 6 having an overhanging depending flange 7. A sealing ring or gasket 8 is fitted peripherally into a corresponding annular slot in the cover, preferably of a dove-tailed shape. The ring 8 is of a cylindrical shape, its width or height being greater than its thickness. The ring 8 is preferably made of a synthetic rubber or other elastic material which withstands high cooking temperature and is not affected by cooking fluids. The lower edge of the ring 8 rests on the upper edge of the vessel 5 sealing the vessel. For locking the cover on the vessel, spaced lugs 9 are provided on the outer peripheral portion of the vessel engaged by inwardly extending shelves 10 at the lower edge of the flange 7. The shelves and the lugs are tapered for tightly drawing the cover against the vessel when the cover is rotated into its closed or operative position with the shelves 10 engaging the lugs 9. The upper portion of the ring is inserted into a corresponding circular recess in the cover so that the entire surface of the ring is concealed within the cover but the surface of the ring engaging the upper edge of the vessel. A recess or cavity 11 is provided in the cover adjacent to the outer side of the ring 8 to allow for the lateral expansion of the latter, when the ring is compressed. When compressed, the ring is also placed under a torsional strain due to the lateral frictional displacement of its upper and lower portions, the torsional strain increasing the sealing effect so that a vapor-tight seal is obtained independently of the vapor pressure in the pot. The cover 6 has a valve opening 15 at the top with a conical seat 16, preferably made of an elastic material such as synthetic rubber for a ball valve 17. A housing 18 encloses the ball and is provided with vent holes 19 for the vapors escaping through the valve. The housing is closed by a cap 20 with a handle 21. The cap is threaded on the housing and is provided with a flaring-out skirt 22 for deflecting the escaping vapors downwardly and away from the hand of the operator which may hold handle 21. The holes 19 for the same purpose are located at the side generally opposite the handle 21. The cap, when screwed on housing 18, may be locked by a screw 22' threaded in the wall of the cap and engaging the housing. A spring 23 urges ball 17 against its seat 16. The spring pressure is adjusted by a screw 24 threaded into the cap and provided with a knob 25 for its rotation. A suitable scale may be provided on the cap for indicating the pressure at which the valve 17 will open.

A handle 30 is provided at the side of the vessel 5 consisting of a metal tubular member 31 which extends from the side of the vessel and may be formed integrally therewith. Tube 31 is covered by a sleeve 32 made of a plastic composition or similar material of low thermal conductivity. A shaft 33 rotates in the tubular member 31 and is provided at the inner end with a fork 34 engaging a roller 35 rotating on a pin 36 extending from the side of the flange 7. A handle 37 is secured on the outer end of the shaft 33 for manual rotation of the shaft. By turning the handle 37, the fork 34 causes the cover to be rotated for engaging or disengaging the lugs 9 on the vessel. The cover, when disengaged, can be readily removed from the vessel, the roller sliding out of the fork 34.

While the invention has been described in detail with respect to a certain particular preferred example, it will be understood by those skilled in the art after understanding the invention, that various changes and further modifications may be made without departing from the spirit and scope of the invention and it is intended therefore in the appended claims to cover all such changes and modifications.

The following is claimed as new:

We claim:

1. A pressure cooker comprising a vessel of generally cylindrical shape open at the top, a handle extending from the side of the vessel, a cover for the vessel, lugs extended outwardly from the sides of the vessel secured thereto, a depending flange at the periphery of the cover integral therewith arranged to extend over the lugs, shelves extended inwardly from the flange and positioned to engage the lugs when the cover is rotated into its locked position, a roller supported on said flange, a fork engaging the roller, a shaft supporting the fork and secured thereto for pivoting the fork in unison with the shaft, said shaft being axially rotatably supported by the handle, and means at a portion of the shaft extended beyond the handle for manually rotating the shaft with the fork, thereby rotating the cover into its locked position on the vessel.

2. A pressure cooker comprising a vessel of generally cylindrical shape open at the top, a tubular handle extending from the side of the vessel, a cover for the vessel, lugs extended outwardly from the sides of the vessel secured thereto, a depending flange at the periphery of the cover integral therewith arranged to extend over the lugs, shelves extended inwardly from the flange and positioned to engage the lugs when the cover is rotated into its locked position, a roller supported on said flange, a fork engaging the roller, a shaft supporting the fork and secured thereto for pivoting the fork in unison with the shaft, said shaft being axially rotatably mounted within the tubular handle, and means at a portion of the shaft extended beyond the handle for manually rotating the shaft with the fork, thereby rotating the cover into its locked position on the vessel.

3. A pressure cooker comprising a vessel of generally cylindrical shape open at the top, a tubular handle extending from the side of the vessel, a cover for the vessel, lugs extended outwardly from the sides of the vessel secured thereto, a depending at the periphery of the cover integral therewith arranged to extend over the lugs, shelves extended inwardly from the flange and positioned to engage the lugs when the cover is rotated into its locked position, a roller, supported on said flange, a fork engaging the roller, a shaft supporting the fork and secured thereto for pivoting the fork in unison with the shaft, said shaft being axially rotatably mounted within the tubular handle and having a portion protruding opposite to the fork from the handle, and a grip secured to said protruding shaft portion for manually rotating the shaft with the fork, thereby rotating the cover into its locked position on the vessel.

4. A pressure cooker as described in claim 2, wherein said roller is slidably engaged between the prongs of the fork, the depth of the prongs providing for sliding displacement of the roller toward and away from the pivot center of the fork.

SANFORD E. RICHESON.
JOSEPH A. ALLEGRO.

REFERENCES CITED

The following references are of record in the file of this patent:

UNITED STATES PATENTS

| Number | Name | Date |
|---|---|---|
| 152,477 | Gaskell | June 30, 1874 |
| 361,345 | Clark et al. | Apr. 19, 1887 |
| 851,969 | Vernon | Apr. 30, 1907 |
| 1,106,837 | Pfaehler et al. | Aug. 11, 1914 |
| 1,508,817 | Pfaehler et al. | Sept. 16, 1924 |
| 1,558,839 | Clark | Oct. 27, 1925 |
| 2,102,962 | Ludington | Dec. 21, 1937 |
| 2,218,188 | Wittenberg | Oct. 15, 1940 |
| 2,243,754 | Honegger | May 27, 1941 |
| 2,254,958 | Beaver et al. | Sept. 2, 1941 |
| 2,334,448 | Sheridan | Nov. 16, 1943 |

FOREIGN PATENTS

| Number | Country | Date |
|---|---|---|
| 171,712 | Switzerland | Dec. 1, 1934 |
| 524,940 | Great Britain | Aug. 19, 1940 |